United States Patent [19]
Yang

[11] Patent Number: 5,703,448
[45] Date of Patent: Dec. 30, 1997

[54] SHUNT-TYPE SPEED CONTROL CIRCUIT HAVING TRANSIENT STORAGE EFFECT FOR A SERIES OR COMPOUND MOTOR

[76] Inventor: Tai-Her Yang, 5-1 Taipin St., Si-Hu Town, Dzan-Hwa, Taiwan

[21] Appl. No.: 546,915

[22] Filed: Oct. 23, 1995

Related U.S. Application Data

[63] Continuation of Ser. No. 87,419, Jul. 8, 1993, abandoned.

[51] Int. Cl.$^6$ .................. H02P 1/18; H02P 7/01; H02K 23/00
[52] U.S. Cl. .................. 318/245; 318/25.1; 318/530; 318/250; 318/252
[58] Field of Search .................. 318/138, 139, 318/245, 254, 252, 250, 251, 253, 376, 373, 273, 269, 268, 530, 531, 770–779, 790; 388/806, 822, 905, 821

[56] References Cited

U.S. PATENT DOCUMENTS

| | | | |
|---|---|---|---|
| 3,596,161 | 7/1971 | Swanke | 318/245 X |
| 3,601,673 | 8/1971 | Mason | 318/507 |
| 3,604,994 | 9/1971 | Conlon | 318/252 |
| 3,678,357 | 7/1972 | Swanke et al. | 318/245 |
| 4,048,550 | 9/1977 | Harris | 318/521 |
| 4,052,647 | 10/1977 | Thompson | 318/139 |
| 4,240,015 | 12/1980 | White | 318/338 |
| 4,275,341 | 6/1981 | Huber et al. | 318/376 |
| 4,375,603 | 3/1983 | Konrad | 318/139 |
| 4,443,744 | 4/1984 | Konrad | 318/269 |
| 4,751,414 | 6/1988 | Davis et al. | 318/381 |
| 4,935,678 | 6/1990 | Houst | 318/268 |
| 5,015,928 | 5/1991 | Yang | 318/250 |
| 5,159,255 | 10/1992 | Weber | 318/775 |
| 5,254,913 | 10/1993 | Yang | 318/251 |
| 5,310,016 | 5/1994 | Rudelle | 318/139 X |

*Primary Examiner*—Paul Ip
*Attorney, Agent, or Firm*—Bacon & Thomas

[57] ABSTRACT

The series field winding of a compound or series motor includes a plurality of taps and, connected in parallel therewith, a transient storage element such as a capacitor, and a flywheel diode. The taps are controlled by switches in the form of transistors or thyristors which are turned on and off by a central control unit in response to setting of the speed and, optionally, various feedback devices such as a motor speed detector, an armature EMF detector, or a load current detector. The transient storage device replaces conventional linear impedance or linear power elements in order to prevent loss of power as the armature voltage is increased.

9 Claims, 1 Drawing Sheet

SHUNT-TYPE SPEED CONTROL CIRCUIT HAVING TRANSIENT STORAGE EFFECT FOR A SERIES OR COMPOUND MOTOR

This application is a continuation of application Ser. No. 08/087,419, filed Jul. 8, 1993, is now abandoned.

SUMMARY OF THE INVENTION

The present invention relates to a series field shunt control in which the series field winding has a plurality of intermediate taps, the series field winding being connected in series with a choke diode between a power supply and the motor armature, and in parallel with an energy storage element in the form of a diode or capacitor. A shunt switch device is connected in parallel between the power supply and each tap, such that when the switch device is open, the motor armature current completely by-passes the series field winding, and when the switch device is closed the power supply current is shunted by the switch device to the armature through additional series field windings or directly to the armature while the field is excited continuously by the energy storage element in order to advance the armature voltage with a much more stable flux intensity depending on the ratio of on-to-off times according to which each shunt switch device is controlled, and thereby provide improved control of the speed of the motor.

A part of the series winding may be connected in parallel to the shunt switch devices with the remaining part maintained in series with the armature in order to provide flexibility, permitting selection of the turn ratio of the relatively controlled winding. In addition, the shunt ratio of the motor can be controlled by feeding back a signal representative of the armature current or running speed. The shunt switch device required by the present design may include a thyristor or switch transistor.

DETAILED DESCRIPTION OF THE INVENTION

Figure 1:
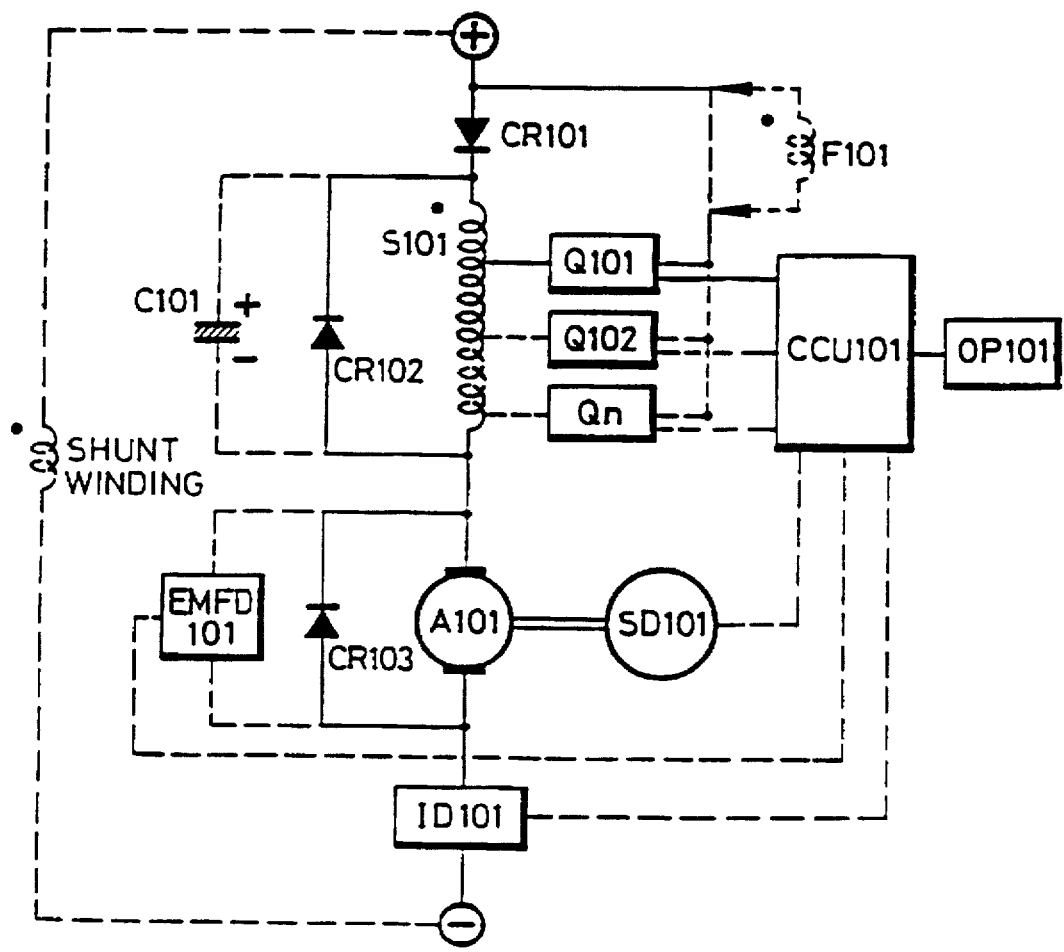
FIG. 1 is a circuit diagram showing a preferred embodiment of the invention.

The series (or compound) motor has been widely applied to various kinds of household appliances, electrical loaders and other machines because it possesses such desirable characteristics as easy speed control and excellent current/torque ratio. However, for various kinds of speed control circuits for series motors, the series field shunting method is advantageous for increasing the armature voltage without changing flux intensity as a greater motor output is achieved. However, when the shunt element is a linear impedance, such as a resistance or linear power element, a power loss and decrease of field excitation occurs, which can be significant when the motor has a large horsepower.

The present multi-step series (or compound) field shunt control circuit, in contrast, provides a transient storage effect by utilizing a series field winding having plural intermediate taps, and connected in series with a choke diode between the power supply and the motor armature, a parallel connected energy storage device, such as a diode, or capacitor, and a shunt switch device connected in parallel between the power supply and each tap, such that when the controlled switch device is open to break the circuit, the motor armature current will completely by-pass the series field winding, and when the switch device is closed or conductive the power supply current will be shunted by the controlled switch device to the armature through the other series windings or directly to the armature as the field is being excited continuously by the storage element in order to increase the armature voltage while maintaining a stable flux intensity depending on the on/off (or conducting/non-conducting) time ratio according to which each shunt switch device is controlled, thereby providing improved control of the speed of motor. A part of the series winding may be connected in parallel to the shunt switch device with the remaining part maintained in series with the armature in order to provide flexibility. In addition, the shunt ratio can be controlled by a feedback signal representative of the current or running speed. The shunt switch device required by the present design may include a thyristor or a transistor switch. Referring to FIG. 1, the preferred circuit includes a series field winding S101 for a series (or compound) motor. The series field winding has at least one intermediate tap and is connected in series between armature A101 and a power supply and in parallel with a flywheel diode CR102 and further in parallel with storage capacitance C101. Optionally, a flywheel diode CR103 may be connected in parallel with armature A101.

A choke diode CR101 is positively connected in series with the series field winding S101, the positive terminal $\oplus$ of the power supply being connected to the series field winding via choke diode CR101, with armature A101 being connected in series between the series field winding S101 and the negative end $\ominus$ of the power supply.

At least one solid-state switch device Q101, Q102, ..., Qn, which may be in the form of a solid-state switch transistor or thyristor, is connected such that its positive end which positively conducts current is directly parallel connected to the positive terminal $\oplus$ of the power supply, and its output end is connected to the connection between the series field winding S101 and armature A101 or to the intermediate tap of the series winding. In the case of plural series field winding taps, plural shunt switch devices may be provided in order to select the turn ratio of the series winding. Optionally, the solid-state switch device Q101 may be jointly connected in series with an auxiliary excitation winding F101.

The state of switches Q101, Q102, ..., Qn is controlled by a central control unit a CCU101 which provides cyclic driving signals or pulses, for example in response to setting and feedback values, so as to control any selected one of the solid-state switch devices, i.e., to select any of the switch devices for relatively cyclic ON/OFF driving or alternative ON/OFF driving by two or more switch devices in order to reduce series field current pulsation.

As will be recognized by those skilled in the art based on the above description, in operation, diode CR101 is employed to limit the electric energy stored by the energy storage devices such as capacitor C101 and flywheel diode CR102, so that the electric energy stored thereby can only discharge electricity to the series field winding S101 to prolong its excitation magnetization time. This allows a stable excitation field to be maintained during cyclical switching, for example between series and shunt operating conditions when an optional shunt winding is provided, or during switching between series operating states.

In the former case, the solid-state switch device $Q_n$ which serves as a shunt connection between the power source and the junction between the armature A101 and series field winding S101 can be operated periodically as follows: When solid state switch device $Q_n$ is OFF, power is provided through the diode CR101 and series field winding S101 to the armature A101 so to effect series excitation of the motor. At this time, the power source simultaneously charges the electricity storing devices. Then, When the solid switch device $Q_n$ is ON, the power source directly charges the armature, and the electricity storing devices discharge to the series field winding S101 to prolong excitation so as to effect shunt running characteristics of the motor. Before the electricity storing devices have fully discharged, the solid state switch device $Q_n$ changes to OFF so as to continue to maintain the series running characteristics of the motor while recharging the energy storage devices. By operating the switch $Q_n$ in this manner, a stable excitation is maintained through the discharge of the energy storage elements during cyclical operation of switch $Q_n$ to effect series and shunt motor characteristics, the impedance value of the series field winding S101 being matched with the switching operation period or frequency of the solid-state switch devices, the capacitor C101 and flywheel diode CR102.

Similarly, whenever it is desired to change the turn ratio of the series field winding by means of switching between solid state switch devices S101, S102, and so forth, to change the turn ratio of the series field winding controlling the rotating speed and power of the armature, discharge of the energy storage devices during switching will reduce the power loss resulting from discontinuities in the excitation field which would otherwise occur during switching.

The feedback element can, for example, be a speed detector SD101 made up of analog or digital sensing elements and coupled to armature A101 for sending respective analog or digital signals representative of armature speed back to control unit CCU101. Alternatively, speed detector SD101 could be replaced by armature EMF detector EMFD101 for providing a speed reference signal or load current detector ID101, which can also transmit analog or digital signals to central control unit CCU101.

Also included is an operation interface OP101 for manual or communication signal inputs to the speed control operation of CCU101 and the power switch device Q101.

The preferred circuit thus may be manually controlled or controlled with feedback signal(s) from a load current detector, speed detector, or EMF detector, or the combination of two or more of the above-mentioned means.

In addition to series motors, the preferred circuit is applicable to compound motors having series windings.

In summary, the preferred shunt motor speed control circuit uses a transient storage effect in order to reduce thermal loss relative to conventional linear power elements or resistances by means of a cyclic changeover of a series field winding having intermediate taps and a shunt switch device, and by virtue of a storage element and choke diode, resulting in improved motor performance and suitability.

I claim:

1. A shunt-type motor speed control circuit, comprising:
    a direct current motor armature;
    a series field winding having a first end connected to a terminal of a diode and a second end connected to the armature;
    at least one tap on the series field winding and at least one switch connected between the tap and a power supply terminal, said diode being connected in series between the power supply terminal and the first end of the series field winding;
    means for controlling said switch to selectively connect said tap with said connection point and thereby change the effective turn ratio of said series winding; and
    transient energy storage means connected in parallel with the series field winding for enabling the series winding to maintain a stable excitation field during switching of said switch.

2. A circuit as claimed in claim 1, wherein said transient energy storage means is a capacitor.

3. A circuit as claimed in claim 1, wherein said switch is controlled in response to feedback signal representative of motor speed.

4. A circuit as claimed in claim 3, wherein said feedback signal is generated by a speed detector.

5. A circuit as claimed in claim 3, wherein said feedback signal is generated by an EMF detector.

6. A circuit as claimed in claim 3, wherein said switch is controlled in response to feedback from a load current detector.

7. A circuit as claimed in claim 1, further comprising a flywheel diode connected in parallel with the series winding and the transient energy storage means.

8. A circuit as claimed in claim 1, wherein said at least one tap is a plurality of taps and said at least one switch device is a corresponding plurality of switch devices, and said control means includes means for cycling between said switch devices.

9. A circuit as claimed in claim 1, wherein said motor is a compound motor and further comprising a shunt winding connected in parallel with said circuit.

* * * * *